(12) United States Patent
Jain

(10) Patent No.: US 12,526,490 B2
(45) Date of Patent: Jan. 13, 2026

(54) GENERATING CONTENT HIGHLIGHTS USING AUDIO ANALYSIS OF THE CONTENT

(71) Applicant: DISH Network Technologies India Private Limited, Bangalore (IN)

(72) Inventor: Pranay Jain, Bengaluru (IN)

(73) Assignee: DISH NETWORK TECHNOLOGIES INDIA PRIVATE LIMITED, Bangalore (IN)

( * ) Notice: Subject to any disclaimer, the term of this patent is extended or adjusted under 35 U.S.C. 154(b) by 0 days.

(21) Appl. No.: 18/669,084

(22) Filed: May 20, 2024

(65) Prior Publication Data

US 2025/0358493 A1    Nov. 20, 2025

(51) Int. Cl.
*H04N 21/8549*    (2011.01)
*H04N 21/439*    (2011.01)

(52) U.S. Cl.
CPC ..... *H04N 21/8549* (2013.01); *H04N 21/4394* (2013.01)

(58) Field of Classification Search
CPC .............. H04N 21/8549; H04N 21/4394
See application file for complete search history.

(56) References Cited

U.S. PATENT DOCUMENTS

| 2020/0037022 | A1* | 1/2020 | Stojancic | H04N 21/4394 |
| 2021/0089268 | A1 | 3/2021 | Ahamed et al. | |
| 2023/0267737 | A1* | 8/2023 | Green | G06F 20/42 |

FOREIGN PATENT DOCUMENTS

WO    WO-2015144243 A1 *    10/2015    ......... H04N 21/4345

* cited by examiner

*Primary Examiner* — Anthony Bantamoi
(74) *Attorney, Agent, or Firm* — Seed Intellectual Property Law Group LLP

(57) ABSTRACT

Techniques for generating content highlights by analyzing audio of the content are disclosed. Content including audio data is obtained. Then, an audio source of the audio data is selected based on a genre of the content. Highlight generation criteria including a highlight generation trigger and a highlight generation parameter are selected based on the selected audio source and a subgenre of the content. The selected audio source in the audio data is analyzed to detect the highlight generation trigger. The highlight is then extracted from the content in response to detection of the highlight-generation trigger in the selected audio source and based on the highlight generation parameter. The highlight may include a portion of the content before the highlight generation trigger is detected, a portion of the content after the highlight generation trigger is detected, or a combination thereof.

20 Claims, 5 Drawing Sheets

GENERATING CONTENT HIGHLIGHTS USING AUDIO ANALYSIS OF THE CONTENT

BACKGROUND

Today, more content is available than ever before in the form of movies, sporting events, video games, television shows, news broadcasts, etc. As a result, it may be impractical for a viewer to watch all the content they are interested in. The viewer may prefer to watch content highlights ("highlights") that summarize important events in content. For example, a highlight for a sporting event such as baseball may include a home run. Highlights may be used to advertise the content, give viewers a preview of the content, summarize the content, etc.

Despite the many important uses of content highlights, conventional techniques for generating highlights from content often require highlights to be manually created by a person viewing the content. This limits the quantity and quality of highlights that are produced. Furthermore, highlights may not be available for all content. These disadvantages limit the viability of using highlights as a way to consume content.

BRIEF SUMMARY

Embodiments described herein utilize audio data of content to automatically generate highlights of the content. In some embodiments, the audio data may be analyzed in real-time or near-real-time to identify and generate the highlights. For example, noise of a crowd cheering during a baseball game may coincide with an exciting event, such as a home run, from which a highlight may be generated.

Depending on a genre of the content, different audio data sources may be used to generate the highlight. Content including audio data is obtained. Then, an audio source in the audio data is selected based on a genre of the content. Highlight generation criteria including a highlight generation trigger and a highlight generation parameter are selected based on the selected audio source and a subgenre of the content. The selected audio source in the audio data is analyzed to detect a highlight generation trigger. The highlight is then extracted from the content in response to detection of the highlight-generation criteria in the selected audio source and based on the highlight generation parameter. In various embodiments, the highlight includes a portion of the content before the highlight generation trigger is detected, a portion of the content after the highlight generation trigger is detected, or a combination thereof.

For example, a highlight in a romance movie may be detected when there is a crescendo in the soundtrack, whereas a highlight in a sporting event may be detected based on a level of crowd noise. Similarly, the highlight may be generating according to various highlight generation parameters based on the genre or subgenre of the content. For example, if in a typical baseball game the crowd cheers loudly two seconds after a successful hit, the highlight generation parameters for the baseball game may indicate to include several seconds of the game before detecting the crowd cheering, so the hit itself is included in the highlight.

In various embodiments, the genre may be a sporting event, movie, a television show, a video game, etc.

In various embodiments, the subgenre may be a baseball game, a romance movie, a comedy television show, a multiplayer online battle arena video game, etc.

In various embodiments, the selected audio source is dialogue, a soundtrack, a commentator, an instrument, crowd noise, etc.

In some embodiments, the highlight generation trigger includes detecting that the selected audio source exceeds a threshold audio magnitude.

In some embodiments, the highlight generation parameter includes specifying a highlight start time or a highlight end time before or after detecting the highlight generation trigger.

Employing embodiments described herein to generate content highlights improves the quantity and quality of highlights created, allows for real-time or near-real-time highlight generation, and allows for highlights to be automatically generated on demand.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure that can be standalone features or combined in one or more scenarios, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References herein to the term "user" generally refer to a person or persons consuming or producing content. Although embodiments described herein utilize user in describing the details of the various embodiments, embodiments are not so limited. For example, in some implementations, the term "user" may be replaced with the term "viewer" throughout the embodiments described herein.

References herein to the term "audio source" generally refer to any distinguishable aspect of an audio signal. An audio source may be audio data associated with a selected microphone; a physical sound source such as one or more people, cars, etc.; an audio channel; a selected instrument; audio in a selected range of frequencies; audio extracted from the audio signal using signal processing techniques; etc.

Figure 1:
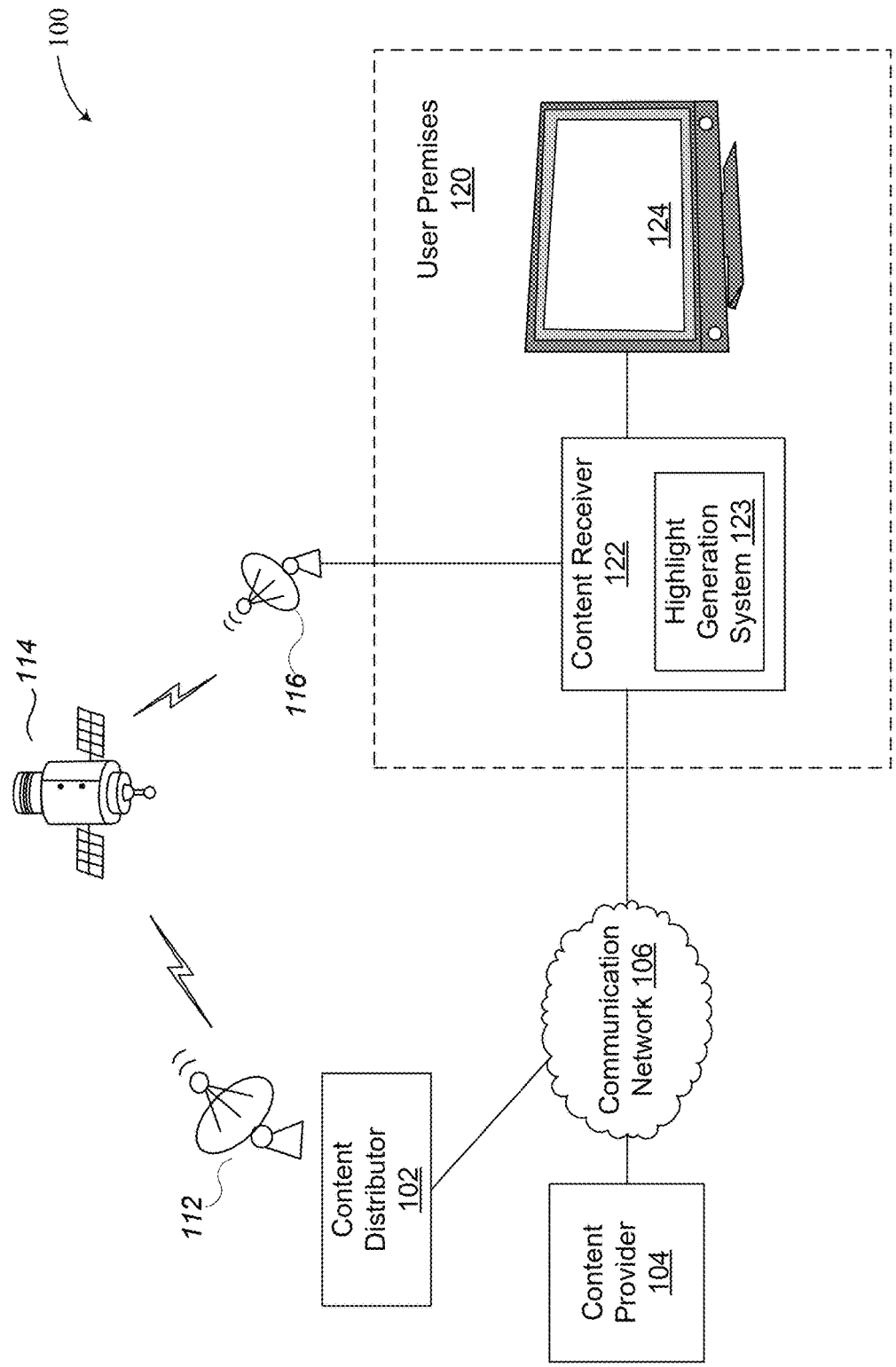
FIG. 1 illustrates a context diagram of an environment to enable generating content highlights using audio analysis according to some embodiments.

FIG. 1 illustrates a context diagram of an environment 100 for generating content highlights using audio analysis in accordance with embodiments described herein. Environment 100 includes content providers 104, content distributor 102, communication network 106, and user premises 120.

User premises 120 includes a content receiver 122 and a display device 124. The content receiver 122 is a computing device that receives content for presentation on the display device 124 to a user (also referred to as a viewer) on the user premises 120. In some embodiments, the content received by the content receiver 122 is or includes audio content for presentation on one or more audio output devices (not illustrated). Examples of content receiver 122 may include, but are not limited to, a set-top box, a cable connection box, a computer, television receiver, radio receiver, or other content receivers. The display device 124 may be any kind of visual content display device, such as, but not limited to a television, monitor, projector, or other display device.

The content receiver 122 is configured to employ highlight generation system 123 to generate content highlights using audio analysis. The highlight generation system 123 generates highlights from content by analyzing the audio of the content. In some embodiments, the highlight generation system 123 generates highlights for content currently displayed on display device 124.

In some embodiments, the highlight generation system generates highlights for content that is not currently displayed on display device 124. For example, the content receiver 122 may generate highlights for a secondary content like a baseball game while the user is watching a primary content like a movie. Then, the content receiver may cause the highlights for the secondary content to be displayed as the highlights are detected, either in full-screen mode or using a portion of the display. The content receiver 122 may cause an indicator to be displayed when a highlight is detected, such that the user may select the indicator to replay the highlight. In some embodiments, the primary content is paused while the highlights are being displayed. The highlights may also be stored and replayed later, such as after the user has finished watching the primary content.

While the example shown in FIG. 1 depicts the highlight generation system 123 as operating on content receiver 122, in various embodiments highlight generation system 123 operates at content provider 104, content distributor 103, satellite 114, another device on user premises, or any other device that receives content.

The content distributor 102 is configured to receive content from one or more content providers 104 and provide that content to the content receiver 122 through a variety of different distribution mechanisms. For example, in some embodiments, content distributor 102 may provide the content to the content receiver 122 directly through communication network 106. In other embodiments, the content may be sent through uplink 112, which goes to satellite 114 and back to downlink station 116 that may also include a head end (not shown). The content is then sent to the content receiver 122. Communication network 106 may be configured to couple various computing devices to transmit content/data from one or more devices to one or more other devices. For example, communication network 106 may be the Internet, X.25 networks, or a series of smaller or private connected networks that carry the content. Communication network 106 may include one or more wired or wireless networks, which may include cellular networks.

Typically, content providers 104 generate, aggregate, and/or otherwise provide content that is provided to one or more viewers. Sometimes, content providers are referred to as "channels" or "stations." Examples of content providers 104 may include but are not limited to: film studios; television studios; network broadcasting companies; independent content producers, such as AMC, HBO, Showtime, or the like; radio stations; or other entities that provide content. A content provider may also include individuals that capture personal or home videos and distribute these videos to others over various online media-sharing websites or other distribution mechanisms. The content provided by content providers 104 may be referred to as the program content, which may include movies, sitcoms, reality shows, talk shows, game shows, documentaries, infomercials, news programs, sports programs, songs, audio tracks, albums, or the like. In this context, program content may also include commercials or other television or radio advertisements. It should be noted that the commercials may be added to the program content by the content providers 104 or the content distributor 102. Embodiments described herein generally refer to content, which includes visual content, audio content, or audiovisual content that includes a video and audio component.

Figure 2:
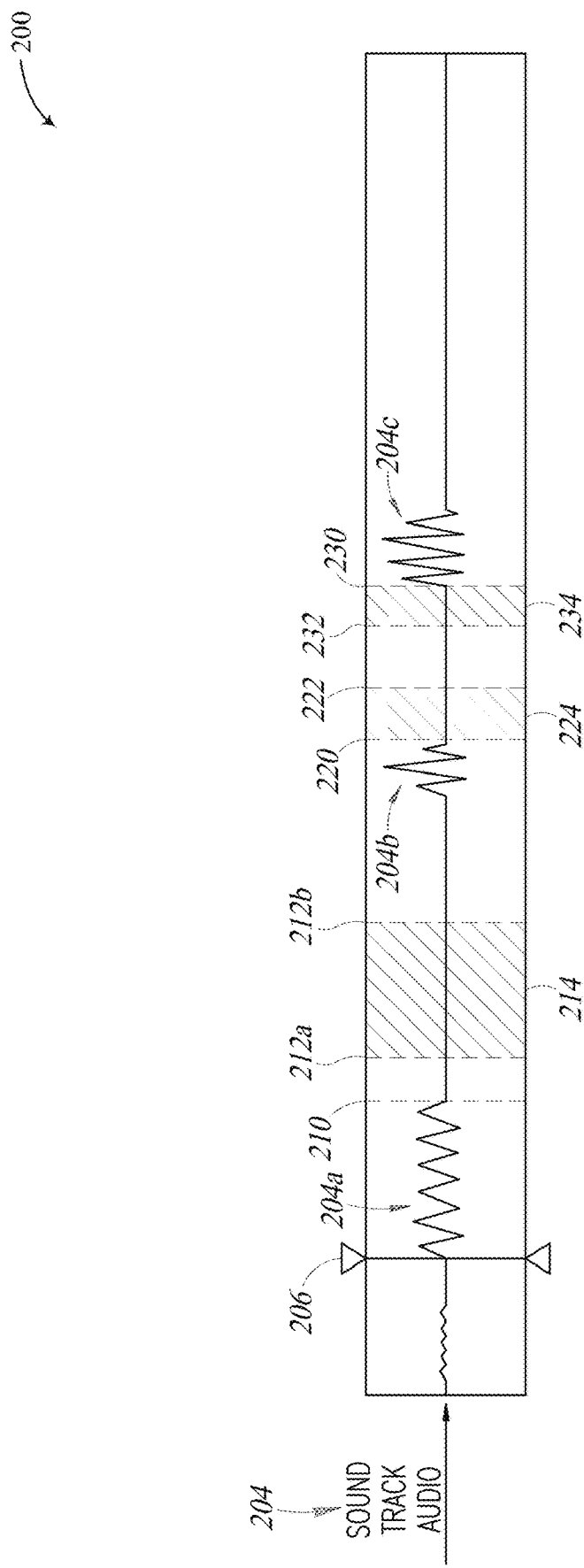
FIG. 2 illustrates a visual example of movie audio that is analyzed to generate content highlights according to some embodiments.

FIG. 2 illustrates example soundtrack audio 204 of movie audio 200 that is analyzed to generate highlights in some embodiments. The generated highlights typically include audio and video of the content, but may include only audio of the content or only video of the content. Soundtrack audio 204 is an audio source from the content. In FIG. 2, soundtrack audio 204 represents soundtrack audio for a movie. Play marker 206 indicates a current playback time for the content. Highlights 214, 224, and 234 are highlights generated using soundtrack audio 204. Soundtrack audio 204 contains soundtrack audio features 204a, 204b, and 204c. In various embodiments, highlight generation is initiated by detection of a highlight generation trigger (the "trigger"). Then, highlight generation is controlled by a highlight generation parameter (the "parameter"). In general, the trigger is selected to correspond to highlights in the content, while the parameter is selected to determine a highlight start time and a highlight end time given the detected trigger. In FIG. 2, triggers 210, 220, and 230 correspond to detections of one or more triggers in soundtrack audio 204, while highlights 214, 224, and 234 are corresponding highlights generated in response to detecting the one or more triggers and using various parameters. The triggers and parameters are described in more detail below.

To generate highlights, soundtrack audio 204 is analyzed to detect one or more highlight triggers. Soundtrack audio feature 204a is analyzed and includes trigger 210, indicating that highlight 214 is to be generated. Highlight 214 has a start time 212a and an end time 212b. Because trigger 210 occurs at the end of soundtrack audio feature 204a, the trigger may be, for example, a sudden decrease in volume of the soundtrack audio.

Analysis of soundtrack audio 204 continues to soundtrack audio feature 204b. Trigger 220 indicates that soundtrack audio feature 204b includes a trigger to generate highlight 224. Highlight 224 has a start time at trigger 220 and an end time 222. Because trigger 220 occurs after soundtrack audio feature 204b, trigger 220 may be a selected sound of audio feature 204b.

Analysis of soundtrack audio 204 continues to soundtrack audio feature 204c. Trigger 230 indicates that soundtrack audio feature 204c includes a trigger to generate highlight 234. Highlight 234 has a start time 232 and an end time at trigger 230. Because trigger 230 is detected at the beginning of soundtrack audio feature 204c, trigger 230 may be a sudden increase in volume of the soundtrack audio. No further triggers are detected in soundtrack audio 204. Accordingly, no further highlights are generated.

As reflected by the various positions of triggers relative to the soundtrack audio features, a trigger may correspond to an increase or decrease in volume of the selected audio, a sound in the selected audio, etc. In various embodiments, the soundtrack audio may be analyzed to detect any number of highlight generation triggers. In FIG. 2, highlight 214, highlight 224, and highlight 234 have each been generated using different triggers, as reflected by the various placement of triggers relative to soundtrack audio features 204a, 204b, and 204c.

When a trigger is detected, a highlight is generated using one or more highlight generation parameters ("parameters"). In general, the parameters indicate a start time and an end time of the highlight to be generated. The parameters are typically used to ensure an appropriate portion of the content is used to generate the highlight. By varying how highlights are generated using parameters, highlights may include relevant content around the trigger. For example, in a romance movie, various triggers in soundtrack audio may be detected relative to a kiss occurring. A crescendo may be detected five seconds before a kiss, silence in the soundtrack may be detected one second before the kiss, or a change to C major in the soundtrack may be detected at the time of the kiss. If the same parameters are used in connection with each of these triggers, the highlights generated may be too long, too short, inconsistent, or omit important portions of the content such as the kiss. Accordingly, the parameters are typically selected to correspond to the various triggers being used and ensure that the highlight includes relevant content. Parameter selection may be done manually or automatically based on highlights from content of a similar genre as the content, as described herein.

In some embodiments, the parameters indicate that a highlight start time is to be different than a time at which the trigger is detected. For example, highlight 214 does not start at highlight generation marker 210. Rather, highlight 214 starts at highlight start time 212a and ends at highlight end time 212b. Such parameters may be selected when the desired highlight typically includes content before and after the trigger. For example, if the trigger is crowd noise, because the crowd is typically responding to an exciting event that already occurred, the parameters may be selected such that a highlight is generated to include several seconds before the crowd noise trigger is detected. In the example shown with respect to highlight 214, the parameters are selected so highlight 214 is generated with start time 212a and end time 212b.

In some embodiments, the parameters indicate that a highlight is to be generated starting at a time at which the trigger is detected. Trigger 220 is detected in soundtrack audio feature 204b. Trigger 220 coincides with a start time of highlight 224, which has end time 222. Typically, such parameters will be selected for use with triggers that correspond to a start of the highlight to be generated. For example, detecting a trigger that includes a crescendo in a romance movie soundtrack may indicate that a kiss may occur within a few seconds. Accordingly, the parameters may be selected to generate a highlight that has a start time when the trigger is detected and an end time several seconds later.

In some embodiments, the parameters indicate that a highlight such as highlight 234 is to be generated with an end time that coincides with a trigger. Trigger 230 is detected in soundtrack audio feature 204c. Parameters have been selected such that highlight 234 has a start time 232 and an end time that coincides with trigger 230, which may be a threshold difference in audio magnitude, such as at the beginning of audio feature 204c.

In some embodiments, audio is analyzed to generate highlights in content before any of the content is viewed by a viewer, or before the viewer views a portion of the content containing the highlight. Referring to FIG. 1, content provider 104 or content distributor 102 may employ embodiments described herein to determine highlights for content before distributing the content to content receiver 122. In some embodiments, the user selects content for which to generate highlights before the user has watched any portion of the content. In some embodiments, highlights of the content are generated in real-time or near-real-time as the viewer watches the content. In FIG. 2, play marker 206 indicates a time at which the content is being replayed to a user. Thus, highlights 214, 224, and 234 have been generated before the user currently viewing the content has viewed the content including highlights 214, 224, or 234.

While highlights are typically generated to include content within a few seconds of detection of the trigger, the disclosure is not so limited. In some embodiments, a highlight is generated using any portion of the content in response to detection of the trigger. For example, highlight 234 may be generated in response to detecting trigger 210, or highlight 214 may be generated in response to detecting trigger 230.

As previously mentioned, while highlights 214, 224, and 234 are discussed herein as portions of soundtrack audio 204 for ease of discussion and illustration, typically a highlight includes video data of the content corresponding to the highlight portions of the selected audio source. In various embodiments, the highlight includes audio of the content, video of the content, or a combination thereof.

Figure 3:
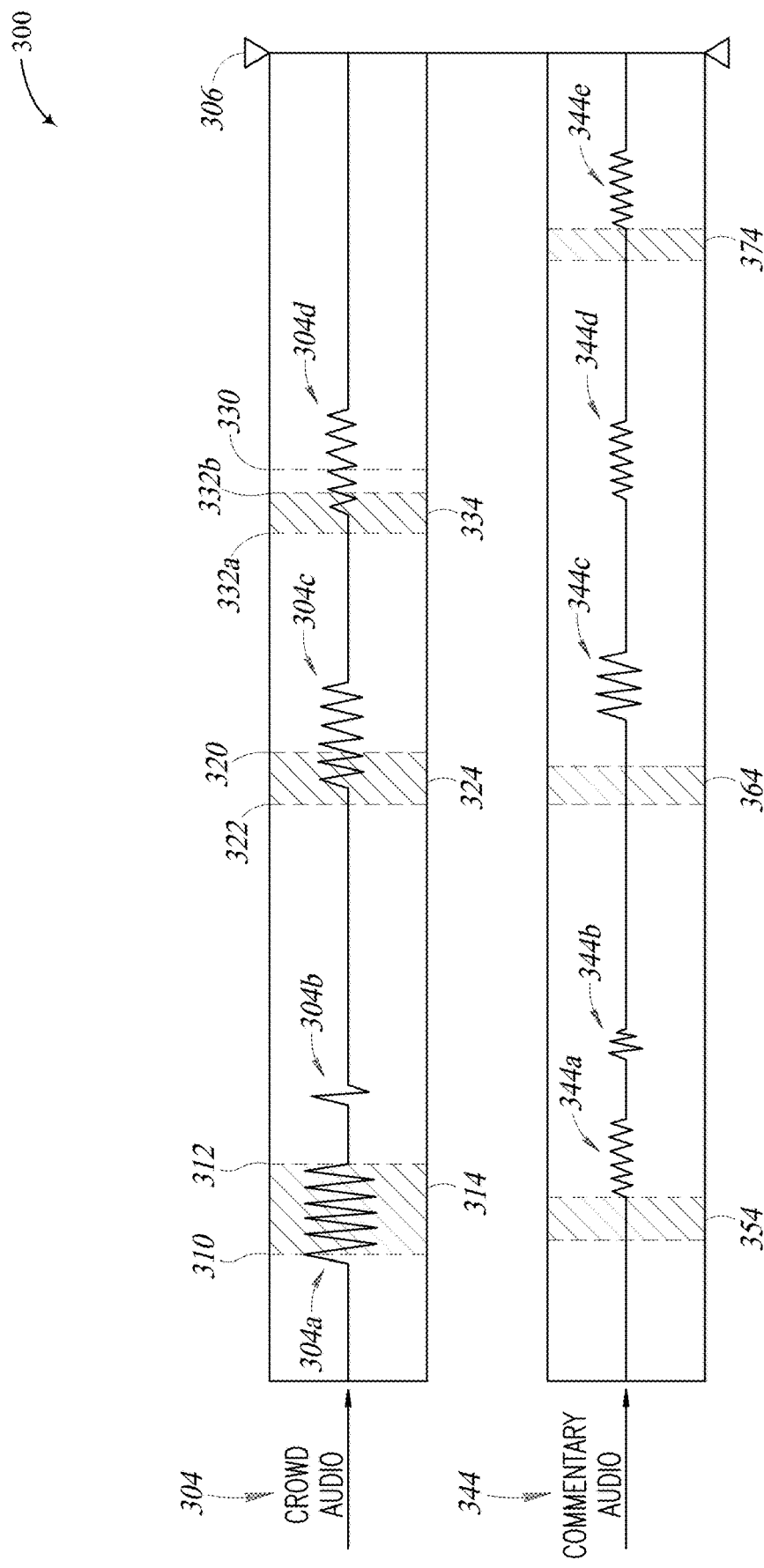
FIG. 3 illustrates visual examples of sporting event audio that are analyzed to generate content highlights according to some embodiments.

FIG. 3 illustrates example sporting event audio 300 that is analyzed to generate content highlights according to some embodiments. Highlights may be generated using various audio sources of audio data. For example, sporting event audio 300 includes crowd audio 304 and commentary audio 344, both of which may be used to generate highlights.

Crowd audio 304 includes crowd audio features 304a, 304b, 304c, and 304d. Highlights 314, 324, and 334 correspond to highlights generated using the crowd audio features. Highlight 314 has a start time at trigger 310 and end time 312. Highlight 324 has a start time 322 and an and time at trigger 320. Highlight 334 has a start time 332a and an end time 332b. Play marker 306 indicates a current playback time for crowd audio 304. Triggers 310, 320, and 330 represent times in crowd audio 304 at which a highlight generation trigger is detected in crowd audio features 304a, 304c, an 304d, respectively. For example, in a baseball game, a homerun is typically considered a highlight and the crowd will often cheer in response to a home run. Thus, a trigger may be crowd noise above a threshold volume such that home runs are identified for generating highlights. No trigger is detected using crowd audio feature 304b, so no corresponding highlight is generated.

Similar to crowd audio 304, commentary audio 344 is analyzed to detect highlight generation criteria. In FIG. 3, highlight 354 is generated using commentary audio feature 344a, highlight 364 is generated using commentary audio feature 344c, and highlight 374 is generated using commentary audio feature 344e. Commentary audio features 344b and 344d do not include a relevant trigger. Thus, no corresponding highlights are generated in response to analyzing commentary audio features 344b and 344d.

In some embodiments, a first select audio source such as commentary audio 344 of sporting event audio 300 may be used instead of, in addition to, or in combination with a second select audio source such as crowd audio 304 to generate highlights for the sporting event content. The highlight generation criteria for the first select audio source may be the same or different than the highlight generation criteria for the second select audio source. In various embodiments, several highlight generation criteria are used.

In some embodiments, a highlight is generated when highlights are generated at a corresponding time using two or more select audio sources. This may allow for more robust highlight generation that reduces generation of false positive highlights. For example, highlight 314 is generated using crowd audio 304, while highlight 354 is generated using commentary audio 344. A highlight may be generated that includes an overlapping portion of highlight 314 and highlight 354. In the example shown in FIG. 3, the overlapping portion of highlight 314 and highlight 354 corresponds to highlight 354. Thus, highlight 314 and 354 may be used to generate highlight 314.

In some embodiments, a highlight is not generated in portions of the content that do not contain two or more overlapping highlights generated using two or more corresponding select audio sources. For example, no highlight may be generated for highlight 334 or highlight 374 because neither highlight 334 nor highlight 374 overlaps with a highlight generated using a second select audio source.

Play marker 306 is at the rightmost end of sporting event audio 300 because the sporting event is being broadcast live. Thus, highlights may be being detected in real-time or near-real-time as the content is received. In some embodiments, real-time highlight detection using embodiments described herein may be used to generate highlights to summarize a portion of the content. For example, if a viewer pauses the content or ceases to watch the content after crowd audio feature 304b, the user may miss highlight 324 if they do not resume watching the content. But because highlight 324 is a generated highlight, if the user resumes watching the content after highlight 324 occurs, the user may be presented with highlight 324 before live replay of the content resumes. In some embodiments, the user may configure various settings related to providing highlights of missed content such as a desired overall time of the highlights, events the user considers to be highlights, etc. For example, the user watching a baseball game may configure the system to generate highlights of homeruns, or to provide up to a 30-second summary of any highlights that may occur when they are not watching the content.

Figure 4:
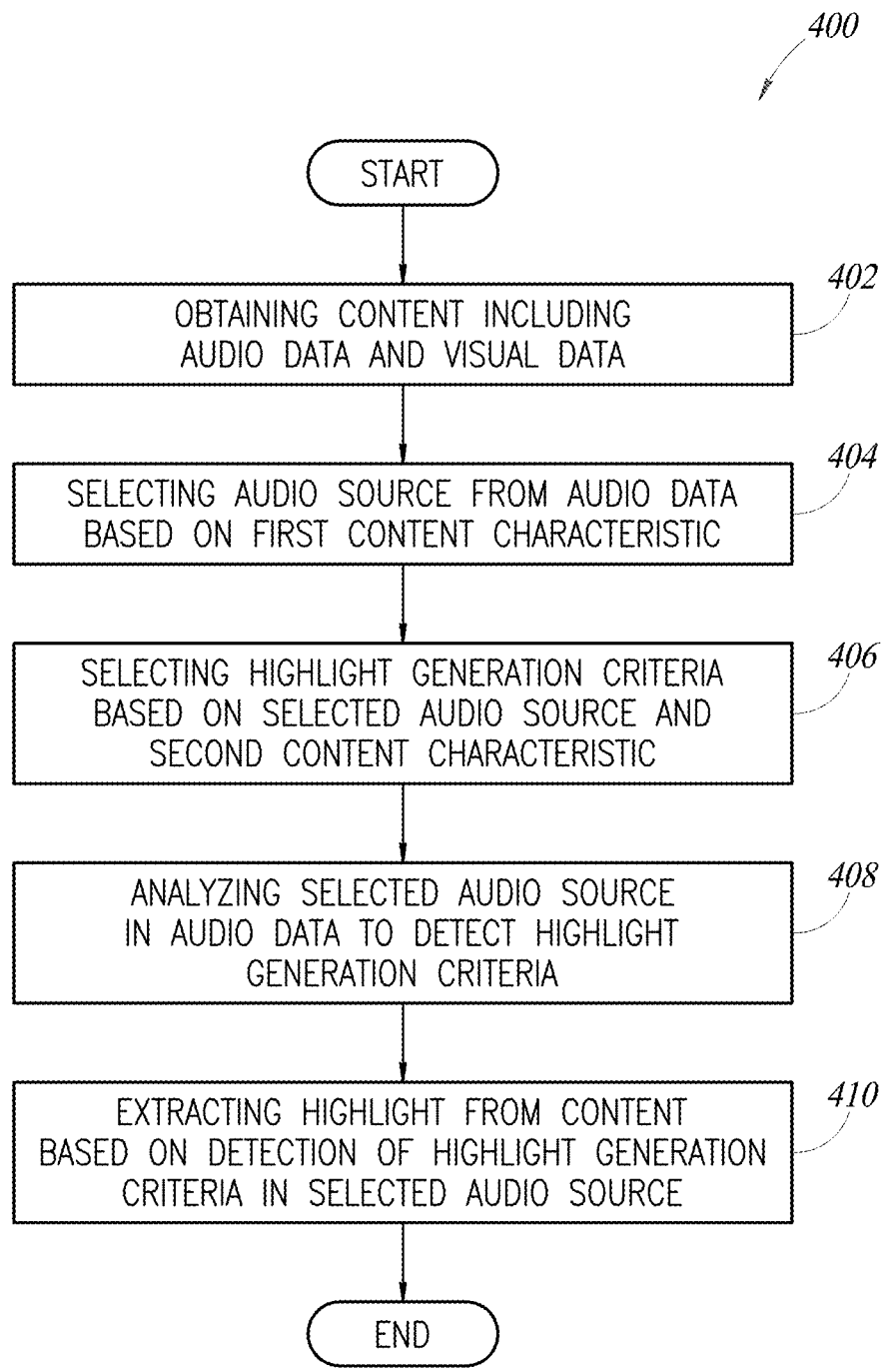
FIG. 4 illustrates a logical flow diagram showing one embodiment of a process for generating content highlights using audio analysis.

FIG. 4 illustrates a logical flow diagram showing one embodiment of a process 400 for generating content highlights using audio analysis. Process 400 begins, after a start block, at block 402, where content including audio data and visual data is obtained. In some embodiments, the content comprises livestreamed content such as a sporting event. In various embodiments, the content includes a movie, a television show, streaming content, a video game or recording thereof, or any other content. After block 402, process 400 continues to block 404.

At block 404, an audio source in the audio data is selected based on a first content characteristic. In some embodiments, the first content characteristic is a genre of the content. For example, the audio source may be selected based on the content being a movie, television show, sporting event, etc. In some embodiments, the first content characteristic is a characteristic of the audio data such as a loudness of the audio data, a variability in loudness of the audio data, etc. The audio source may be obtained using the first characteristic and a lookup table or other data structure that contains associations between characteristics and audio sources. Selecting the audio source may comprise selecting one or more filtering or signal processing techniques by which the audio source may be at least partially isolated from other audio sources in the audio data.

The audio source may be a soundtrack, spectators of an event, dialogue, special effects, commentary, audio in a selected frequency range, etc. In some embodiments, the audio source is selected from a plurality of audio sources identified in the audio data using one or more known signal processing techniques such as principal component analysis (PCA). After block 404, process 400 continues to block 406.

At block 406, highlight generation criteria are selected based on the selected audio source and a second content characteristic. The highlight generation criteria typically include one or more highlight generation triggers (e.g., "triggers") and one or more highlight generation parameters (e.g., "parameters").

Triggers may specify a threshold audio magnitude for a threshold period of time, a specified harmonic set of pitches in the selected audio source, a selected noise in the selected audio source, etc.

A trigger is selected for the content depending on a characteristic of the content such as on a genre or subgenre of the content so appropriate highlights may be generated. For example, in a romance movie, characters kissing is typically considered a highlight. Before kissing, the soundtrack may change to C Major or crescendo, background audio may be reduced, etc. Thus, the trigger may include detecting a key signature change to C Major or a crescendo in the soundtrack, a reduction of background noise, etc. For a horror movie, a highlight such as a monster appearing may be indicated by a relatively large change in soundtrack audio volume, discordant instrumentals, etc.

In some embodiments, the trigger is automatically selected or generated based on stored triggers of other content having a same genre or subgenre of the content using various statistical techniques such as regression. For example, if several romance movie highlights include a similar audio feature, that audio feature may be used as a trigger to generate future highlights in romance movies.

In some embodiments, a selection of a trigger is received from a user to capture what the user considers highlights. If the user considers jokes in a movie to be highlights, the user may select laughter as a trigger, such that highlights generated include jokes, laughter, or a combination thereof. If the user considers car chases to be highlights, the user may select car engine noise as a trigger, such that highlights generated include car chases.

An interface may be provided by which a user selects one or more triggers. The interface may display several types of highlights, such as jokes or car chases, for which triggers have been preconfigured by the user or others. The preconfigured triggers associated with the type of highlight may then be used to generate highlights from content.

The interface may allow the user to manually configure a trigger by the user providing a sound, a change in audio volume, etc., to use as a trigger. The manually configured triggers may then be saved and associated with a type of highlight, such that the user or others may easily use the manually configured triggers to detect highlights in the future.

In some embodiments, the user may be a user that is operating the content receiver that is displaying the content, such as content receiver 122 in FIG. 1. In other embodiments, the user may be a user associated with a content provider, such as content provider 104 in FIG. 1, which is providing content to be displayed via a content receiver.

In some embodiments, a trigger is modified based on a rate at which the trigger is detected in the selected audio source as it is being analyzed. If a trigger is detected at a rate below a lower threshold or above an upper threshold in the selected audio source, the trigger may be modified such that a target rate of highlight generation is achieved. For example, if the trigger is crowd noise above a certain loudness and the trigger has been detected at a rate greater than the upper threshold, the loudness of crowd noise required to detect the trigger may be increased so the trigger may be detected at a lower rate. Similarly, if crowd noise has been detected at a rate lower than the lower threshold, the loudness of crowd noise required to detect the trigger may be decreased so the trigger may be detected at a lower rate. By dynamically modifying a trigger based on the selected audio source, a trigger may be automatically adapted to various genres of content. For example, crowd noise in a game of golf may still be a relevant indicator of an exciting event, but the loudness of the crowd noise may be far lower than in other sporting events. Thus, by dynamically changing the trigger, a same trigger may be more usable to generate highlights in different types of content, for example, both golf and baseball. In some embodiments, generating a highlight in response to detecting the trigger is disabled for a configurable period of time after a highlight is generated using the trigger.

As discussed herein, one or more parameters specify how a highlight is to be generated in response to a trigger being detected. The parameters may include one or more user-configurable time offsets that determine when a start time of a highlight is generated relative to detection of a trigger. For example, the parameters may be configured such that highlights are generated using content that starts 1, 5, 10, 20, etc., seconds before or after the highlight generation trigger is detected. A duration of the highlight to be generated may be similarly configured. In some embodiments, parameter configurations apply to all triggers. In some embodiments, parameter configurations apply to a selected set of triggers, such as to triggers associated with a genre of content. Highlights of relatively short duration may be preferred for a first genre of content, while highlights of relatively long duration may be preferred for a second genre of content. Thus, a relatively long highlight duration may be applied to triggers associated with the first genre, while a relatively short highlight duration may be applied to triggers associated with the second genre.

In some embodiments, the parameters are determined based on highlights generated for content having the second content characteristic. For example, if the second content characteristic is that the content is a baseball game, baseball games for which highlights have already been generated may be analyzed to determine how highlights are to be generated for content having the second content characteristic. If a baseball game for which highlights have previously been generated includes a highlight that begins 5 seconds before a home run hit and ends 6 seconds after the home run hit, the one or more highlight generation parameters may indicate to begin a highlight 5 seconds before each home run hit and end the highlight 6 seconds after each home run hit. After block 406, process 400 continues to block 408.

At block 408, the selected audio source in the audio data is analyzed to detect the highlight generation criteria. As discussed herein, the highlight generation criteria typically include one or more highlight generation triggers to be detected. In some embodiments, the selected audio source is analyzed to detect multiple highlight generation triggers. The selected audio source may be extracted, at least in part, from the audio data using various known signal processing techniques such as principal component analysis, high-pass or low-pass filtering, etc. This may allow various attributes of the selected audio source to be more accurately analyzed. For example, if the selected audio source is crowd noise in a loud sporting event with many audio sources, a loudness of the crowd versus various other audio sources may be distinguished by at least partially isolating the selected audio source from other sources in the audio data. Then, the distinguished selected audio is then analyzed to detect the highlight generation trigger. After block 408, process 400 continues to block 410.

At block 410, a highlight is extracted from the content based on detection of the highlight generation criteria in the selected audio source. In some embodiments, the highlight includes audio of the content, video of the content, or a combination thereof. After block 410, process 400 ends at an end block.

While process 400 is discussed in terms of one audio source and one set of highlight generation criteria, the disclosure is not so limited. In various embodiments, a plurality of audio sources in the audio data may be selected to be analyzed to detect one or more sets of content generation criteria. For example, FIG. 3 illustrates crowd audio 304 and commentary audio 344, both of which may be used to generate highlights. Furthermore, each selected audio source may be analyzed using its own triggers, parameters, or both. For example, crowd audio 304 may be analyzed to detect highlight generation criteria including crowd noise above a threshold, while commentary audio 344 may be analyzed to detect highlight generation criteria including commentators talking above a noise threshold for a specified duration of time.

As discussed herein, embodiments of process 400 may be used to generate highlights in real-time or near-real-time for content a viewer may have missed. For example, a viewer watching a baseball game displayed using display device 124 may turn off, pause, or otherwise stop watching the baseball game. While the viewer is not watching the baseball game, embodiments of process 400 may be employed by content receiver 122 to identify highlights of the baseball game. Then, when the viewer resumes viewing the baseball game, the content receiver 122 may display one or more highlights generated while the viewer was not watching the baseball game, allowing the viewer to quickly understand that happened in the baseball game while they were not watching.

Figure 5:
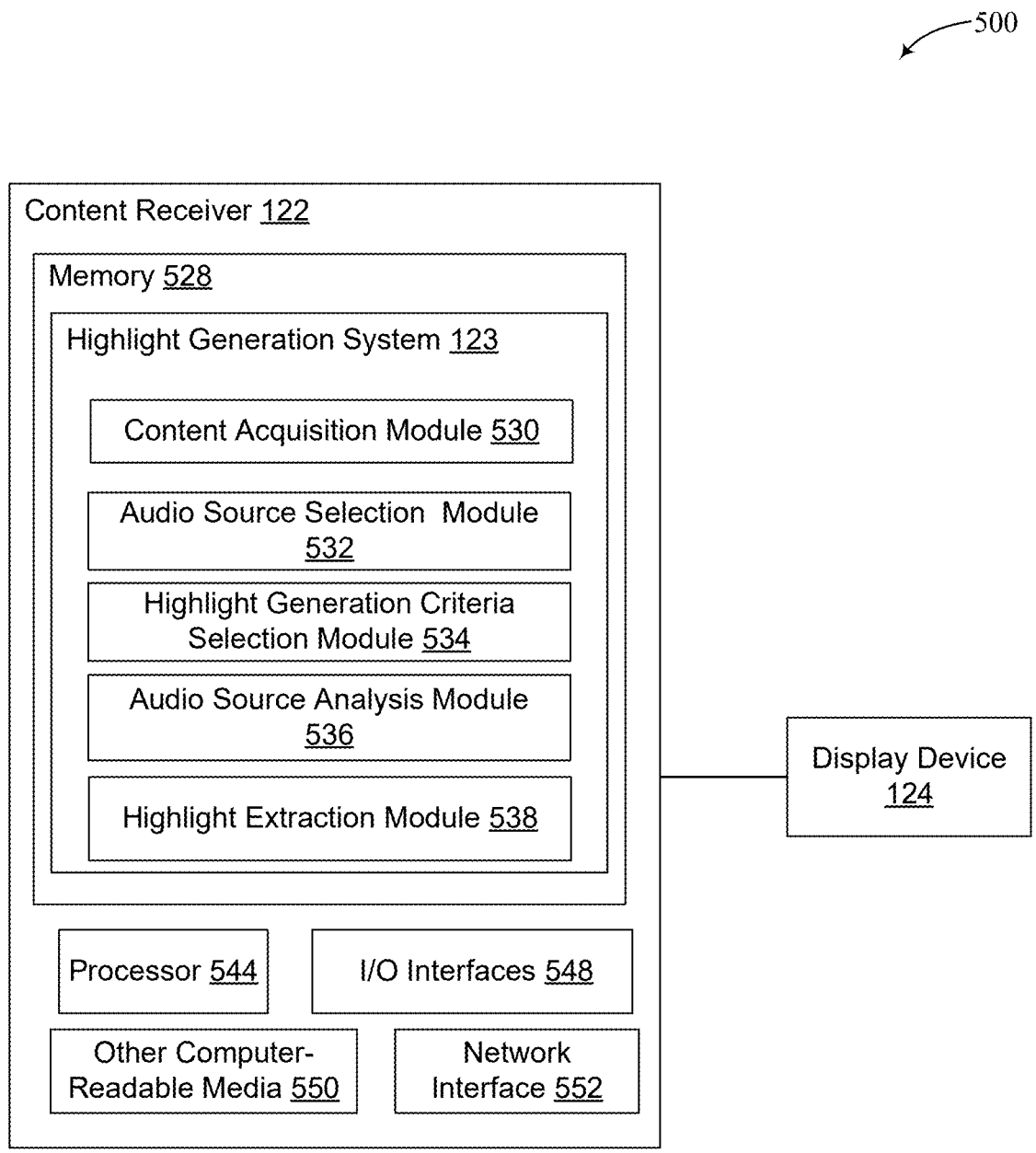
FIG. 5 shows a system diagram that describes one implementation of a computing system for implementing embodiments described herein.

FIG. 5 shows a system diagram that describes one implementation of a computing system for implementing embodiments described herein. System 500 includes content receiver 122, and display device 124, similar to what is described above in conjunction with FIG. 1.

As described herein, the content receiver 122 is a computing device that can perform functionality described herein for generating content highlights based on audio analysis of the content. One or more special purpose computing systems may be used to implement the content receiver 122. Accordingly, various embodiments described herein may be implemented in software, hardware, firmware, or in some combination thereof. The content receiver 122 includes memory 528, processor 544, network interface 552, input/output (I/O) interfaces 548, and other computer-readable media 550.

Processor 544 includes one or more processors, one or more processing units, programmable logic, circuitry, or one or more other computing components that are configured to perform embodiments described herein or to execute computer instructions to perform embodiments described herein. In some embodiments, a processor system may include a single processor 544 that operates individually to perform actions. In other embodiments, a processor system may include a plurality of processors 544 that operate to collectively perform actions, such that one or more processors 544 may operate to perform some, but not all, of such actions. Reference herein to "a processor system" refers to one or more processors 544 that individually or collectively perform actions. And reference herein to "the processor system" refers 1) a subset or all of the one or more processors 544 comprised by "a processor system" and 2) any combination of the one or more processors 544 comprised by "a processor system" and one or more other processors 544.

Memory 528 may include one or more various types of non-volatile or volatile storage technologies. Examples of memory 528 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. Memory 528 may be utilized to store information, including computer-readable instructions that are utilized by a processor system to perform actions, including at least some embodiments described herein.

Memory 528 may have stored thereon highlight generation system 123, which is described in more detail herein. In various embodiments, the video adjustment system 212 may include a content acquisition module 530, an audio source selection module 532, a highlight generation criteria selection module 534, an audio source analysis module 536, and a highlight generation module 538.

The content acquisition module 530 is configured to acquire content that includes audio data. The audio source selection module 532 is configured to select an audio source of the audio data to analyze for generating highlights. The highlight generation criteria selection module 534 is configured to select highlight generation criteria based on a second characteristic of the content. As discussed herein, the highlight generation criteria typically includes one or more highlight generation triggers and one or more highlight generation parameters. The audio source analysis module 536 is configured to analyze the selected audio source for a highlight generation trigger that indicates a highlight is to be generated. The highlight generation module 538 is configured to generate a content highlight in response to detection of the highlight generation trigger and based on the highlight generation parameter.

Although the content acquisition module 530, the audio source selection module 532, the highlight generation criteria selection module 534, the audio source analysis module 536, and the highlight generation module 538 are illustrated as separate modules, embodiments are not so limited. Rather, the functionality of the content acquisition module 530, the audio source selection module 532, the highlight generation criteria selection module 534, the audio source analysis module 536, and the highlight generation module 538 may be performed or implemented by one module or a plurality of modules.

Network interface 552 is configured to communicate with other computing devices, such as to receive content to be displayed on the display device 124. I/O interfaces 548 may include interfaces for various other input or output devices, including display device 124. The I/O interfaces 548 may also include interfaces for other input output devise, such as USB interfaces, physical buttons, keyboards, haptic interfaces, tactile interfaces, or the like. Other computer-readable media 550 may include other types of stationary or removable computer-readable media, such as removable flash drives, external hard drives, or the like.

The following is a summary of the claims as originally filed.

A method for generating a highlight for content may be summarized as including obtaining content including audio data and visual data; selecting an audio source from the audio data based on a genre of the content; selecting highlight generation criteria, wherein the highlight generation criteria include a highlight generation trigger and a highlight generation parameter; while the content is being obtained, analyzing the selected audio source in the audio data to detect the highlight generation trigger; and in response to detecting the highlight generation trigger, generating the highlight from the content based on the highlight generation parameter.

Generating the highlight from the content may include in response to detecting the highlight generation trigger and based on the highlight generation parameter, selecting a highlight start time and a highlight end time; and generating the highlight from the content based on the highlight start time and the highlight end time.

Generating the highlight from the content may include in response to detecting the highlight generation trigger and based on the highlight generation parameter, selecting a highlight start time, wherein the highlight start time occurs before detection of the generation trigger in the selected audio source; and generating the highlight from the content based on the highlight start time.

Generating the highlight from the content may include in response to detection of the highlight generation trigger and based on the highlight generation parameter, selecting a highlight start time, wherein the highlight start times occurs after detection of the highlight generation trigger in the selected audio source; and generating the highlight from the content based on the highlight start time.

Selecting the audio source from the audio data may include selecting a portion of the audio data associated with spectators of the audio data.

Selecting the audio source from the audio data may include selecting a portion of the audio data associated with a soundtrack of the audio data.

Selecting the audio source from the audio data may include retrieving sample content having a content type and a known highlight; identifying a target audio source from a plurality of audio sources in the sample content associated with the known highlight; and selecting the target audio source as the audio source for content sharing the content type.

Selecting the audio source from the audio data based on the genre of the content may include selecting the audio source from a plurality of audio sources in the audio data based on the content being associated with a sporting event.

Selecting the audio source from the audio data based on the genre of the content may include identifying a plurality of audio sources of the audio data; and selecting, based on the genre, the audio source from the plurality of audio sources.

Selecting the audio source from the audio data based on the genre of the content may include identifying a plurality of audio sources of the audio data using principal component analysis; and selecting, based on the genre, the audio source from the plurality of audio sources.

Detecting the highlight generation trigger may include detecting that the selected audio source exceeds a threshold audio magnitude.

Detecting the highlight generation trigger may include detecting that audio of the selected audio source that exceeds a threshold audio magnitude for a threshold period of time.

Detecting the highlight generation trigger may include detecting a specified harmonic set of pitches in the selected audio source.

Detecting the highlight generation trigger may include detecting one or more specified noises in the selected audio source.

A system for generating a highlight for content may be summarized as including one or more memories configured to collectively store computer instructions; and a processor system configured to collectively execute the stored computer instructions to perform actions to: acquire content that includes audio data; select an audio source from the audio data based on a genre of the content; select a highlight generation trigger and a highlight generation parameter based on the content; analyze the selected audio source to detect the highlight generation trigger; and in response to detecting a highlight generation signature, extract the highlight from the content using the highlight generation parameter.

The processor system may extract the highlight from the content by being further configured to: in response to detecting the highlight generation trigger and based on the highlight generation parameter, determine a highlight start time, wherein the highlight start time occurs before detection of the highlight generation signature in the content; and extract the highlight from the content using the highlight start time.

The processor system may extract the highlight from the content by being further configured to: in response to detection of the highlight generation trigger and based on the highlight generation parameter, determine a highlight start time, wherein the highlight start time occurs after the highlight generation trigger in the content; and extract the highlight from the content using the highlight start time.

The processor system may select the audio source from the audio data based on the genre of the content by being further configured to: identify a plurality of audio sources in the audio data; and select, based on the genre of the content, the audio source from the plurality of audio sources.

The processor system may detect the highlight generation trigger in the selected audio source by being further configured to: distinguish the selected audio source from one or more other audio sources in the audio data; and detect the highlight generation signature in the distinguished selected audio source.

One or more non-transitory computer-readable media that store instructions that, when executed by a processor in a computing system, cause the processor to perform actions, the actions may be summarized as including obtaining audio data of content; selecting an audio source from the audio data based on a genre of the content; selecting a highlight generation trigger based on the selected audio source; analyzing the content to detect the highlight generation trigger in the content; and presenting a highlight to a viewer based on detection of the highlight generation trigger in the content.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for generating a highlight for content, comprising:

obtaining content including audio data and visual data;

selecting an audio source from the audio data based on a genre of the content;

selecting highlight generation criteria, wherein the highlight generation criteria include a highlight generation trigger and a highlight generation parameter that is selected based on the highlight generation trigger;

while the content is being obtained, analyzing the selected audio source in the audio data to detect the highlight generation trigger; and in response to detecting the highlight generation trigger, generating the highlight from the content based on the highlight generation parameter.

2. The method of claim 1, wherein generating the highlight from the content comprises:

in response to detecting the highlight generation trigger and based on the highlight generation parameter, selecting a highlight start time and a highlight end time; and generating the highlight from the content based on the highlight start time and the highlight end time.

3. The method of claim 1, wherein generating the highlight from the content comprises:
in response to detecting the highlight generation trigger and based on the highlight generation parameter, selecting a highlight start time, wherein the highlight start time occurs before detection of the generation trigger in the selected audio source; and
generating the highlight from the content based on the highlight start time.

4. The method of claim 1, wherein generating the highlight from the content comprises:
in response to detection of the highlight generation trigger and based on the highlight generation parameter, selecting a highlight start time, wherein the highlight start times occurs after detection of the highlight generation trigger in the selected audio source; and
generating the highlight from the content based on the highlight start time.

5. The method of claim 1, wherein selecting the audio source from the audio data comprises:
selecting a portion of the audio data associated with spectators of the audio data.

6. The method of claim 1, wherein selecting the audio source from the audio data comprises:
selecting a portion of the audio data associated with a soundtrack of the audio data.

7. The method of claim 1, wherein selecting the audio source from the audio data comprises:
retrieving sample content having a content type and a known highlight;
identifying a target audio source from a plurality of audio sources in the sample content associated with the known highlight; and
selecting the target audio source as the audio source for content sharing the content type.

8. The method of claim 1, wherein selecting the audio source from the audio data based on the genre of the content comprises:
selecting the audio source from a plurality of audio sources in the audio data based on the content being associated with a sporting event.

9. The method of claim 1, wherein selecting the audio source from the audio data based on the genre of the content comprises:
identifying a plurality of audio sources of the audio data; and
selecting, based on the genre, the audio source from the plurality of audio sources.

10. The method of claim 1, wherein selecting the audio source from the audio data based on the genre of the content comprises:
identifying a plurality of audio sources of the audio data using principal component analysis; and
selecting, based on the genre, the audio source from the plurality of audio sources.

11. The method of claim 1, wherein detecting the highlight generation trigger comprises:
detecting that the selected audio source exceeds a threshold audio magnitude.

12. The method of claim 1, wherein detecting the highlight generation trigger comprises:
detecting that audio of the selected audio source that exceeds a threshold audio magnitude for a threshold period of time.

13. The method of claim 1, wherein detecting the highlight generation trigger comprises:
detecting a specified harmonic set of pitches in the selected audio source.

14. The method of claim 1, wherein detecting the highlight generation trigger comprises:
detecting one or more specified noises in the selected audio source.

15. A system for generating a highlight for content, comprising:
one or more memories configured to collectively store computer instructions; and
a processor system configured to collectively execute the stored computer instructions to perform actions to:
acquire content that includes audio data;
select an audio source from the audio data based on a genre of the content;
select a highlight generation trigger and a highlight generation parameter based on the content, wherein the highlight generation parameter is selected based on the highlight generation trigger;
analyze the selected audio source to detect the highlight generation trigger; and
in response to detecting the highlight generation trigger, extract the highlight from the content using the highlight generation parameter.

16. The system of claim 15, wherein the processor system extracts the highlight from the content by being further configured to:
in response to detecting the highlight generation trigger and based on the highlight generation parameter, determine a highlight start time, wherein the highlight start time occurs before detection of the highlight generation trigger in the content; and
extract the highlight from the content using the highlight start time.

17. The system of claim 15, wherein the processor system extracts the highlight from the content by being further configured to:
in response to detection of the highlight generation trigger and based on the highlight generation parameter, determine a highlight start time, wherein the highlight start time occurs after the highlight generation trigger in the content; and
extract the highlight from the content using the highlight start time.

18. The system of claim 15, wherein the processor system selects the audio source from the audio data based on the genre of the content by being further configured to:
identify a plurality of audio sources in the audio data; and
select, based on the genre of the content, the audio source from the plurality of audio sources.

19. The system of claim 15, wherein the processor system detects the highlight generation trigger in the selected audio source by being further configured to:
distinguish the selected audio source from one or more other audio sources in the audio data; and
detect the highlight generation trigger in the distinguished selected audio source.

20. One or more non-transitory computer-readable media that store instructions that, when executed by a processor in a computing system, cause the processor to perform actions, the actions comprising:
obtaining audio data of content;
selecting an audio source from the audio data based on a genre of the content;

selecting a highlight generation trigger based on the selected audio source;
selecting a highlight generation parameter based on the highlight generation trigger;
analyzing the content to detect the highlight generation trigger in the content; and
based on detecting the highlight generation trigger in the content, presenting a highlight of the content based on the highlight generation parameter to a viewer.

\* \* \* \* \*